(12) United States Patent
Lan

(10) Patent No.: US 9,250,379 B2
(45) Date of Patent: Feb. 2, 2016

(54) BACKLIGHT MODULE

(71) Applicant: AU Optronics Corp., Hsin-Chu (TW)

(72) Inventor: Jyun-Kai Lan, Kaohsiung (TW)

(73) Assignee: AU OPTRONICS CORP., Hsin-Chu (TW)

( * ) Notice: Subject to any disclaimer, the term of this patent is extended or adjusted under 35 U.S.C. 154(b) by 317 days.

(21) Appl. No.: 13/925,905

(22) Filed: Jun. 25, 2013

(65) Prior Publication Data

US 2014/0301104 A1    Oct. 9, 2014

(30) Foreign Application Priority Data

Apr. 3, 2013    (TW) .............................. 102112153 A

(51) Int. Cl.
*F21V 8/00* (2006.01)
*G02F 1/1335* (2006.01)

(52) U.S. Cl.
CPC ............. *G02B 6/0051* (2013.01); *G02B 6/0031* (2013.01); *G02B 6/0053* (2013.01); *G02B 6/0088* (2013.01); *G02F 1/133615* (2013.01)

(58) Field of Classification Search
CPC .. G02B 6/0088; G02B 6/0031; G02B 6/0051; G02B 6/0053; G02F 1/133615
USPC ......... 362/607, 561, 97.2, 330, 511, 278, 306
See application file for complete search history.

(56) References Cited

U.S. PATENT DOCUMENTS

| | | | |
|---|---|---|---|
| 8,228,462 B2 * | 7/2012 | Sasaki et al. ................... | 349/62 |
| 2012/0147626 A1 * | 6/2012 | Huang .......................... | 362/612 |
| 2012/0162568 A1 * | 6/2012 | Sugawara ..................... | 349/58 |

FOREIGN PATENT DOCUMENTS

| | | |
|---|---|---|
| CN | 201044030 Y | 4/2008 |
| CN | 102175001 A | 9/2011 |
| CN | 102313209 A | 1/2012 |
| CN | 102691929 A | 9/2012 |
| TW | 201227086 A | 7/2012 |

OTHER PUBLICATIONS

Intellectual Property Office, Ministry of Economic Affairs, R.O.C., "Office Action", Mar. 20, 2015, Taiwan.
State Intellectual Property Office of the People's Republic of China, "Office Action", China, Jan. 20, 2015.

* cited by examiner

*Primary Examiner* — Sean Gramling
*Assistant Examiner* — Naomi M Wolford
(74) *Attorney, Agent, or Firm* — Tim Tingkang Xia; Locke Lord LLP

(57) ABSTRACT

A backlight module includes a reflector, a light guide plate and a film. The reflector includes a supporting plate and two extending portions, and the extending portions are located on two opposite sides of the supporting plate, respectively. The film includes a main body and two positioning portions, and the positioning portions are located on two opposite sides of the main body, respectively. The light guide plate is located between the supporting plate and the main body. The main body corresponds to the supporting plate, and the positioning portions correspond to the extending portions. The extending portions are bent toward the main body, and the positioning portions are bent toward the supporting plate. The positioning portions are at least partially overlapped with and are fixed to the extending portions, respectively.

14 Claims, 20 Drawing Sheets

BACKLIGHT MODULE

CROSS-REFERENCE TO RELATED APPLICATIONS

This non-provisional application claims priority under 35 U.S.C. §119(a) on Patent Application No(s). 102112153 filed in Taiwan, R.O.C. on Apr. 3, 2013, the entire contents of which are hereby incorporated by reference.

TECHNICAL FIELD

The disclosure relates to a backlight module of a display device, and more particularly to a backlight module including a positioning structure of films.

BACKGROUND

Due to being thin in thickness, light in weight, easy to carry, and having lower radiation compared with the CRT display, the demand for the liquid crystal display panels (LCD Panel) has been rapidly increased in recent years. With the LCD manufacturing development, the backlight module has moved further toward the concepts of having a thin shape, a high brightness and reducing the cost.

Please refer to FIG. 9, which is a schematic view of a conventional backlight module. As shown in FIG. 9, the conventional backlight module 40 comprises a back bezel 400', a reflector 110', a light guide plate 120' and multiple films 130'. The light guide plate 120' is located in the back bezel 400', and the multiple films 130' are flat and stacked up on the light guide plate 120. Positioning portions 133', located on one edge of the multiple films 130', have a through hole 134', respectively. The multiple films 130' are fastened to the back bezel 400' by a pin 410' of the back bezel 400' penetrating through each of the through holes 134'. However, thermal expansion space, formed between the multiple films 130' and the back bezel 400', needs to be reserved to prevent the multiple films 130' from being pressed, which leads to warping, waving or shifting. Therefore, the mura defect may be generated. Additionally, the back bezel 400' needs to include space S to accommodate the positioning portions 133' so that the width of the bezel may not be reduced to meet the demand for a narrow bezel in current backlight modules.

Therefore, a display module needs to be provided to solve the problem that the width of the bezel may not be reduced due to the positioning structure of the films as well as to enhance the displaying quality.

SUMMARY

The disclosure provides a backlight module comprising a reflector, a light guide plate, and a film. The reflector includes a supporting plate and two extending portions, and the extending portions are located on two opposite sides of the supporting plate, respectively. The film includes a main body and two positioning portions, and the positioning portions are located on two opposite sides of the main body, respectively. The light guide plate is located between the supporting plate and the main body. The main body corresponds to the supporting plates, and the positioning portions correspond to the extending portions. The extending portions are bent toward the main body, and the positioning portions are bent toward the supporting plate. The positioning portions are at least partially overlapped with and fixed to the extending portions, respectively.

BRIEF DESCRIPTION OF THE DRAWINGS

The disclosure will become more fully understood from the detailed description given herein below for illustration only, thus does not limit the disclosure, wherein.

DETAILED DESCRIPTION

Figure 1:
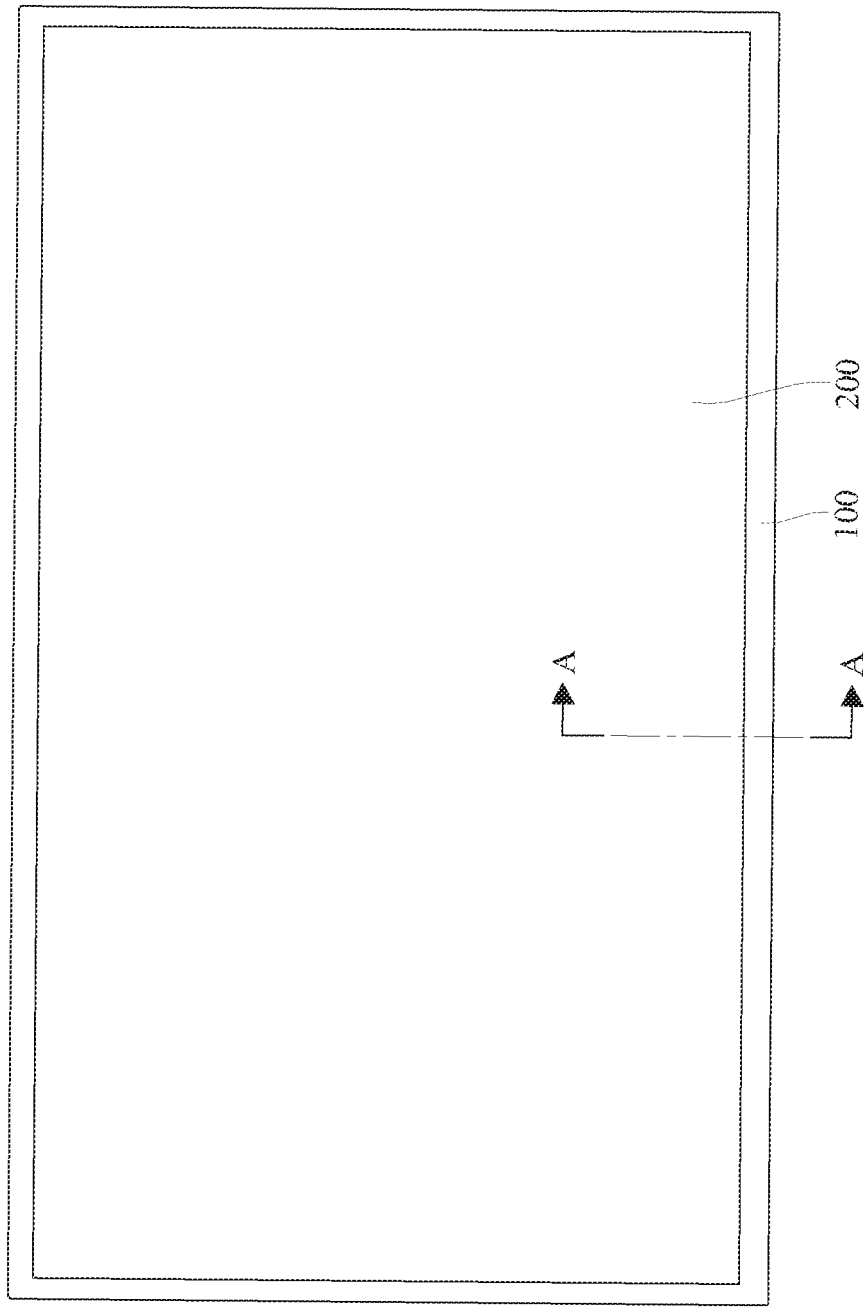
FIG. 1 is a schematic front view of a display device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
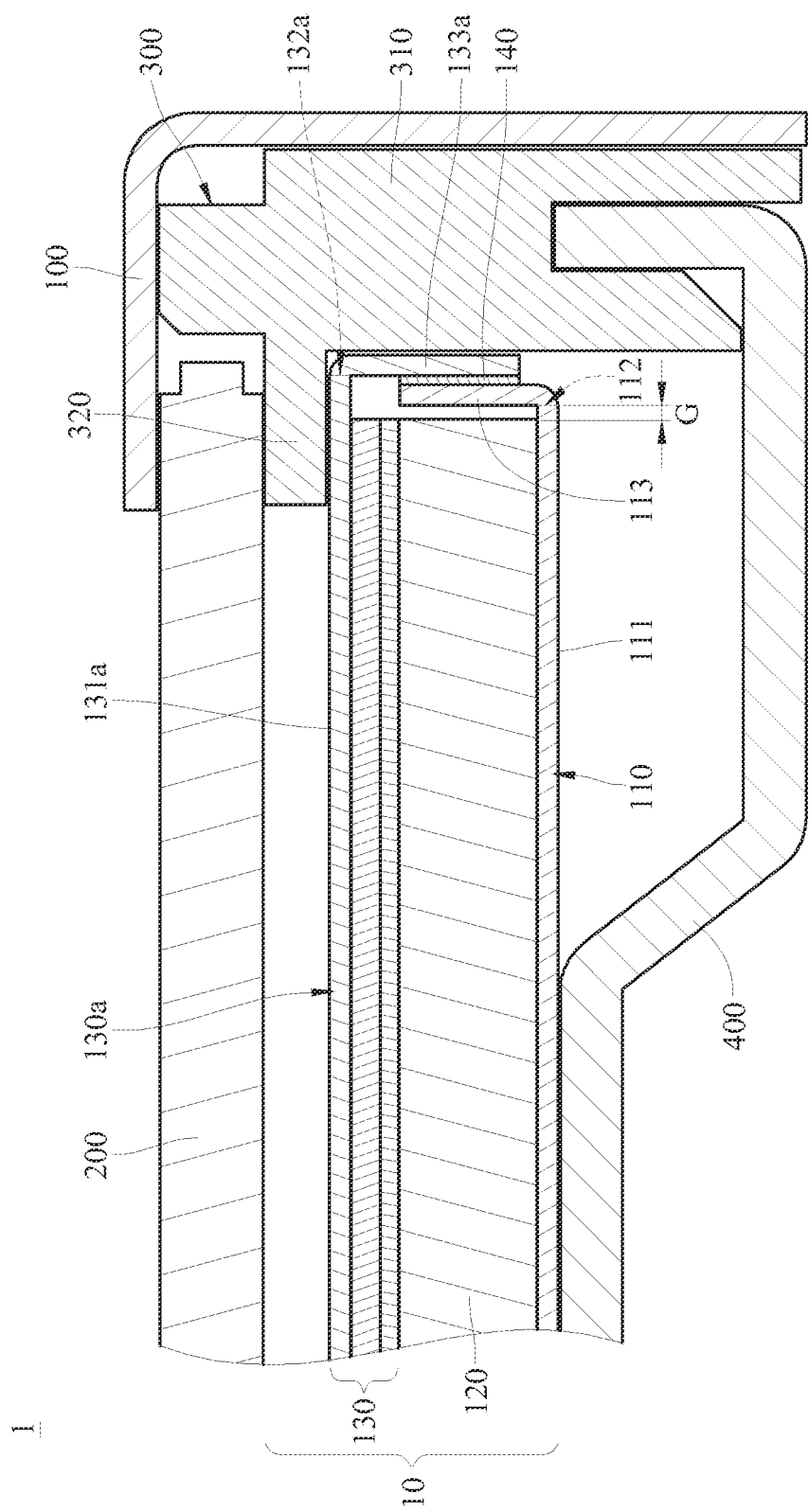
FIG. 2 is a cross-sectional view of the display device along a line 1A-1A in FIG. 1.

FIG. 1 is a schematic front view of a display device according to a first embodiment of the disclosure. FIG. 2 is a cross-sectional view of the display device along a line 1A-1A in FIG. 1. First, please refer to FIGS. 1 and 2 together, a display device 1 comprises a back bezel 400, a backlight module 10, a display panel 200 and a front bezel 100. The backlight module 10 is disposed on the back bezel 400. The backlight module 40 comprises a reflector 110, a light guide plate 120 and multiple films 130. The light guide plate 120 is disposed on the reflector 110, and the multiple films 130 are disposed on the light guide plate 120.

Figure 3A:
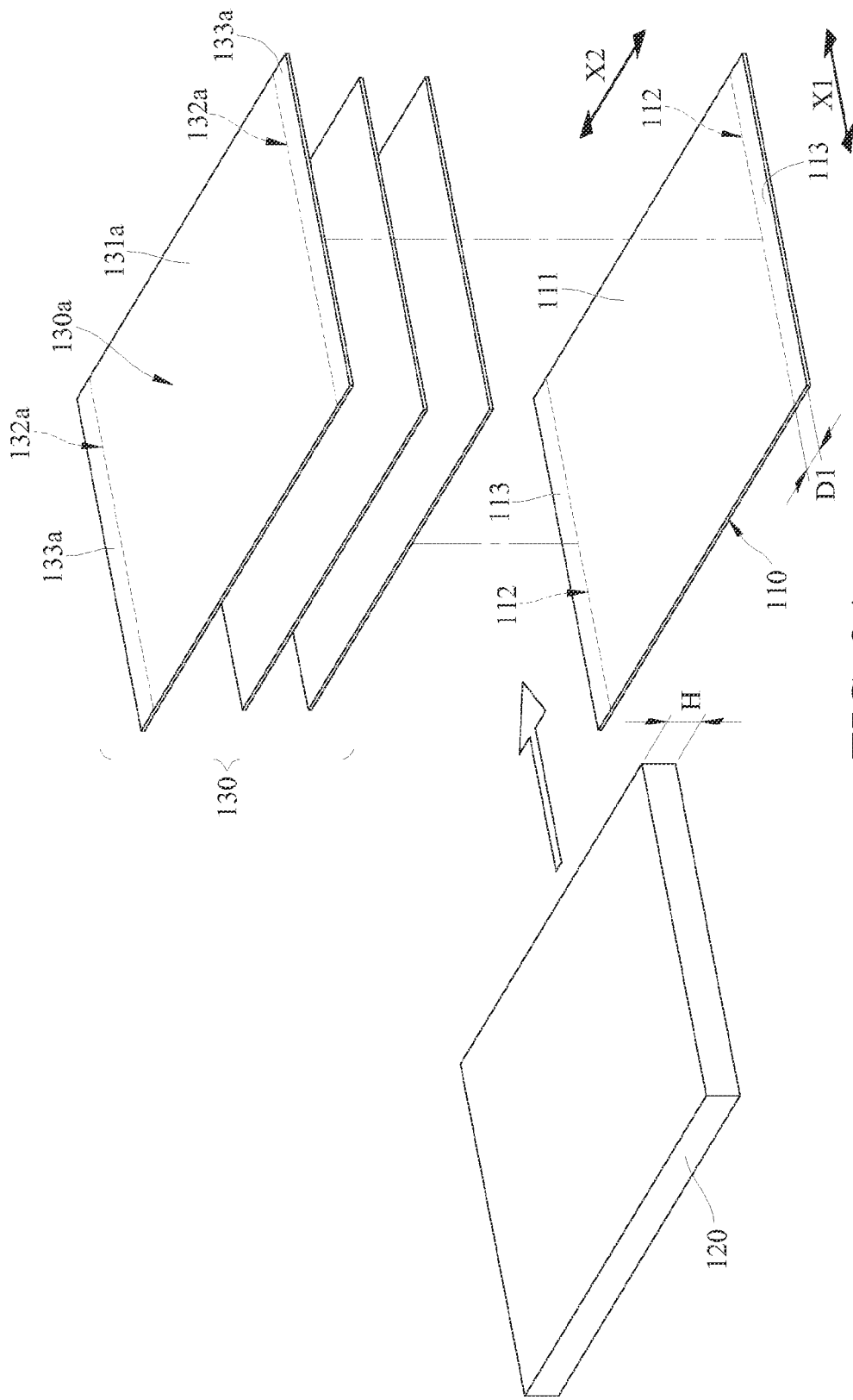
FIGS. 3A to 3C are schematic assembly views of a backlight module according to the first embodiment of the disclosure.
Figure 3B:
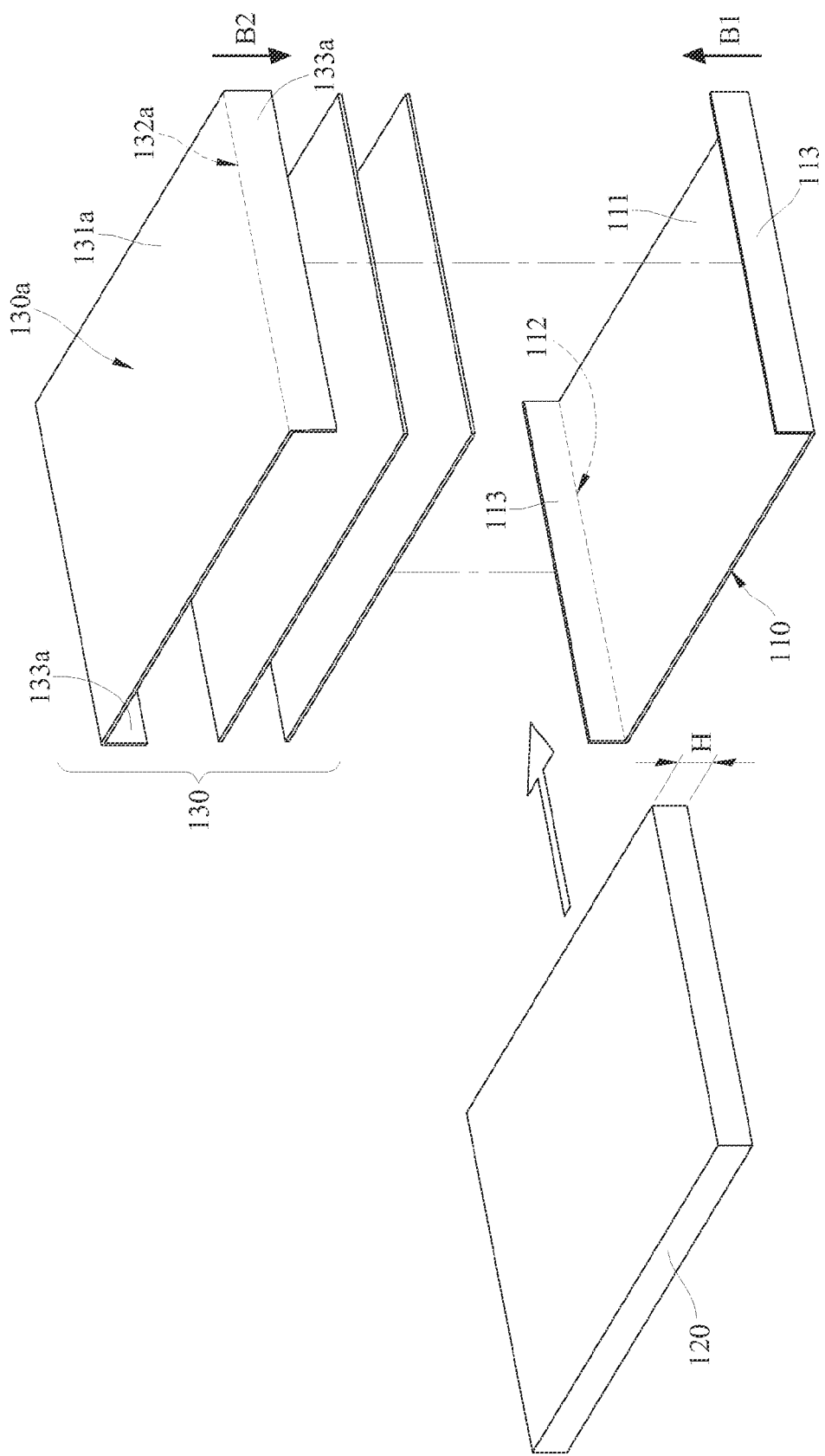

The reflector 110 includes a supporting plate 111 and two extending portions 113, and the extending portions 113 are located on two opposite sides of the supporting plate 111, respectively. An upper film 130a of the multiple films 130 includes a main body 131a and two positioning portions 133a, and the positioning portions 133a are located on two opposite sides of the main body 131a, respectively. The main body 131a corresponds to the supporting plate 111. In other words, the projection area of the main body 131a in the supporting plate 111 overlaps the supporting plate 111 (as shown in FIG. 3A, which is a schematic assembly view of a backlight module according to the first embodiment of the disclosure). The light guide plate 120 is located between the supporting plate 111 and the main body 131a. The extending portions 113 are bent in the direction B1 toward the supporting plate 111 (as shown in FIG. 3B, which is a schematic assembly view of a backlight module according to the first embodiment of the disclosure). The positioning portions 133a are bent in the direction B2 toward the main body 131a (as shown in FIG. 3B). Each of the positioning portions 133a is fixed to the corresponding extending portion 113 and are at least partially overlapped with the extending portion 113, respectively, so that the reflector 110 and the film 130a form a box-shaped (cubical-shaped) structure together, and the box-shaped structure is adapted for accommodating the light guide plate 120 thereto.

As shown in FIG. 2, the backlight module 10 further comprises a frame 300. The frame 300 and the front bezel 100 are adapted for clamping the display panel 200 together. The frame 300 includes a frame body 310 and a carrying portion 320. The carrying portion 320 protrudes from the inner surface of the frame body 310 toward the inside of the frame body 310. The frame body 310 surrounds the reflector 110. Furthermore, the carrying portion 320 carries the display panel 200 and presses the multiple films 130. The light guide plate 120 and the reflector 110 are adapted for evenly distributing the light which is generated by the backlight module 10. In this embodiment, the multiple films 130 of the backlight module 10 comprise a diffuser, prism sheets or other films, according to the demand for adjusting the light.

Figure 3C:
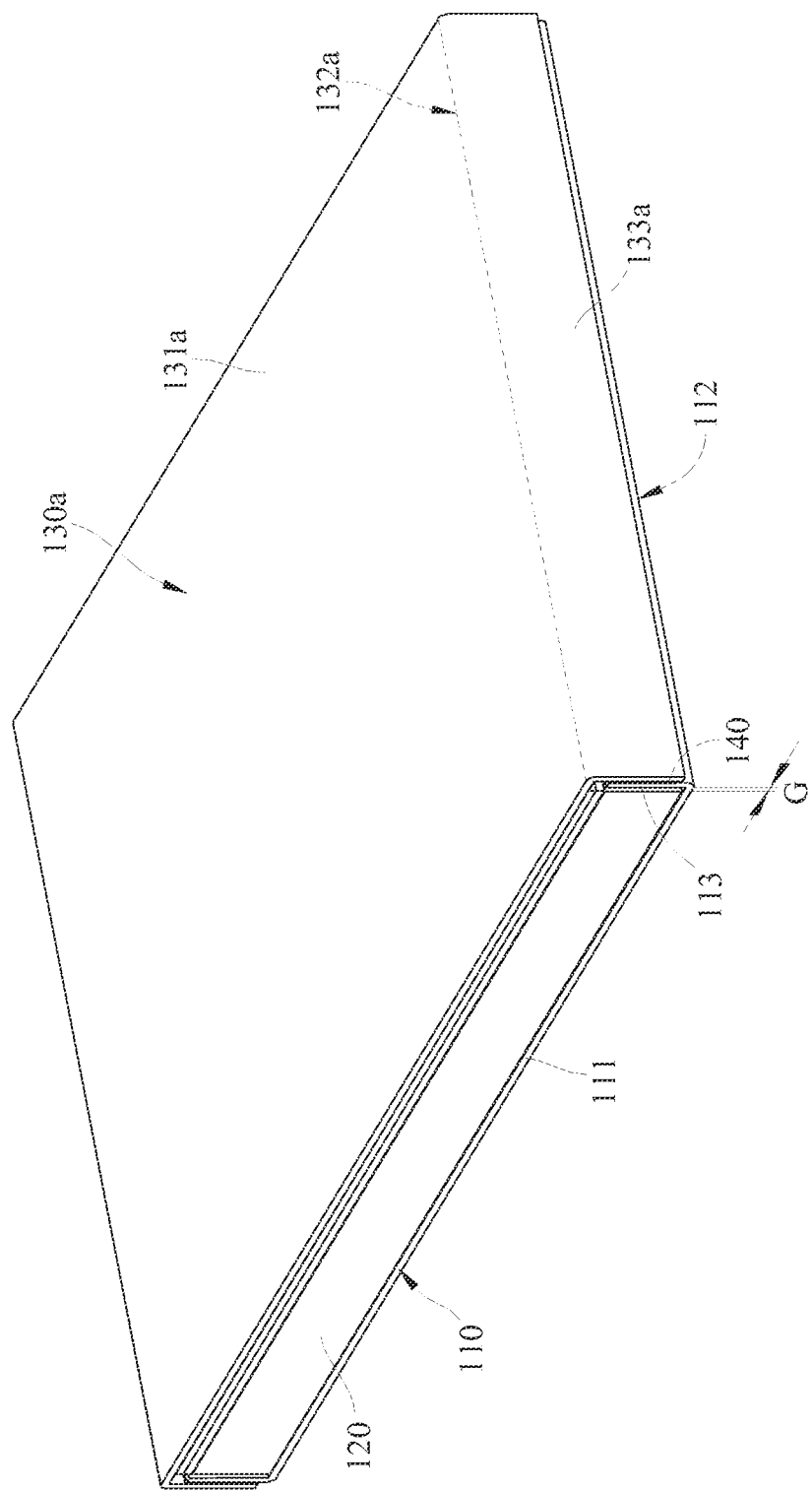

FIGS. 3A to 3C are schematic assembly views of the backlight module according to a first embodiment of the disclosure. Furthermore, as shown in FIG. 3A, the reflector 110 includes a supporting plate 111 and two extending portions 113. The two extending portions 113 are located on two opposite sides of the supporting plate 111, respectively.

Furthermore, multiple first fold lines 112 are formed between the supporting plate 111 and each of the extending portions 113, respectively. The upper film 130a of the multiple films 130 includes a main body 131a and two positioning portions 133a, and the two positioning portions 133a are located on two opposite sides of the main body 131a, respectively. Furthermore, multiple second fold lines 132a are formed between the main body 131a and each of the positioning portions 133a, respectively.

As shown in FIG. 3B, afterwards, the extending portions 113 are bent along the first fold line 112 and in the direction B1. The positioning portions 133a are bent along the second fold line 132a and in the direction B2. As shown in FIG. 3C, the light guide plate 120 is disposed on the supporting plate 111, and the multiple films 130 are disposed on the light guide plate 120. The light guide plate 120 is located between the supporting plate 111 and the main body 131a. In this embodiment, the positioning portions 133a are attached to the outer side of the extending portions 113 by an adhesive 140.

However, the fastening method of the positioning portions 133a and the extending portions 113 in the above-mentioned embodiments are not limited thereto. The disclosure is applied only if the positioning portions 133a and the extending portions 113 are fastened to each other (eg. in an engaging manner). However, the positioning portions 133a also may be attached to the inner side of the extending portions 113. The material of the adhesive 140 may be a glue or a double-sided tape, but is not limited to the disclosure. In other embodiments of the disclosure, referring to FIGS. 4A and 4B described hereafter, the positioning portions 133a are connected with the extending portions 113 by a single-sided tape. In some other embodiments of the disclosure, some or all films of the multiple films 130 have the positioning portions 133a, which are bent along the second fold lines 132a and in the direction B2 so as to extend toward the main body 131a.

Referring to FIG. 2, gaps G are formed between each of the first fold lines 112 and the edge of the light guide plate 120, respectively. That is, when the extending portions 113 are bent along the first fold line 112 and in the direction B1, the light guide plate 120 is disposed on the supporting plate 111, and a gap G is formed between the light guide plate 120 and the extending portions 113. The gap G is reserved space of the light guide plate 120 for thermal expansion.

It is worth noting that the light guide plate 120 is contained in the box-shaped structure formed by the reflector 110 and the film 130a together. The length D1 of the extending portions 113 in the direction B1 is greater than or equal to the maximum thickness H of the light guide plate 120 (as shown in FIG. 3A). In other words, when the shape of the light guide plate is irregular, such as a wedge shape that the heights of both sides of the light guide plate are different, the length D1 of the extending portions 113 should be greater than the maximum thickness H of the light guide plate 120. The extending portions 113 and the extending portions 113 of the reflector 110 may be partially overlapped with each other only if the positioning portions 133a and the extending portions 113 of the reflector 110 are attached to be fastened to each other.

Moreover, in comparison with the conventional backlight module 40, because the reflector 110 is fastened to the film 130a by the connection between the extending portions 113 and the positioning portions 133a, the back bezel 400 of the backlight module 10 does not need to reserve an extra space for the positioning portions 133a. Therefore, the width of the bezels 100 and 400 may be reduced to meet the demand for narrow bezels 100 and 400.

Figure 4A:
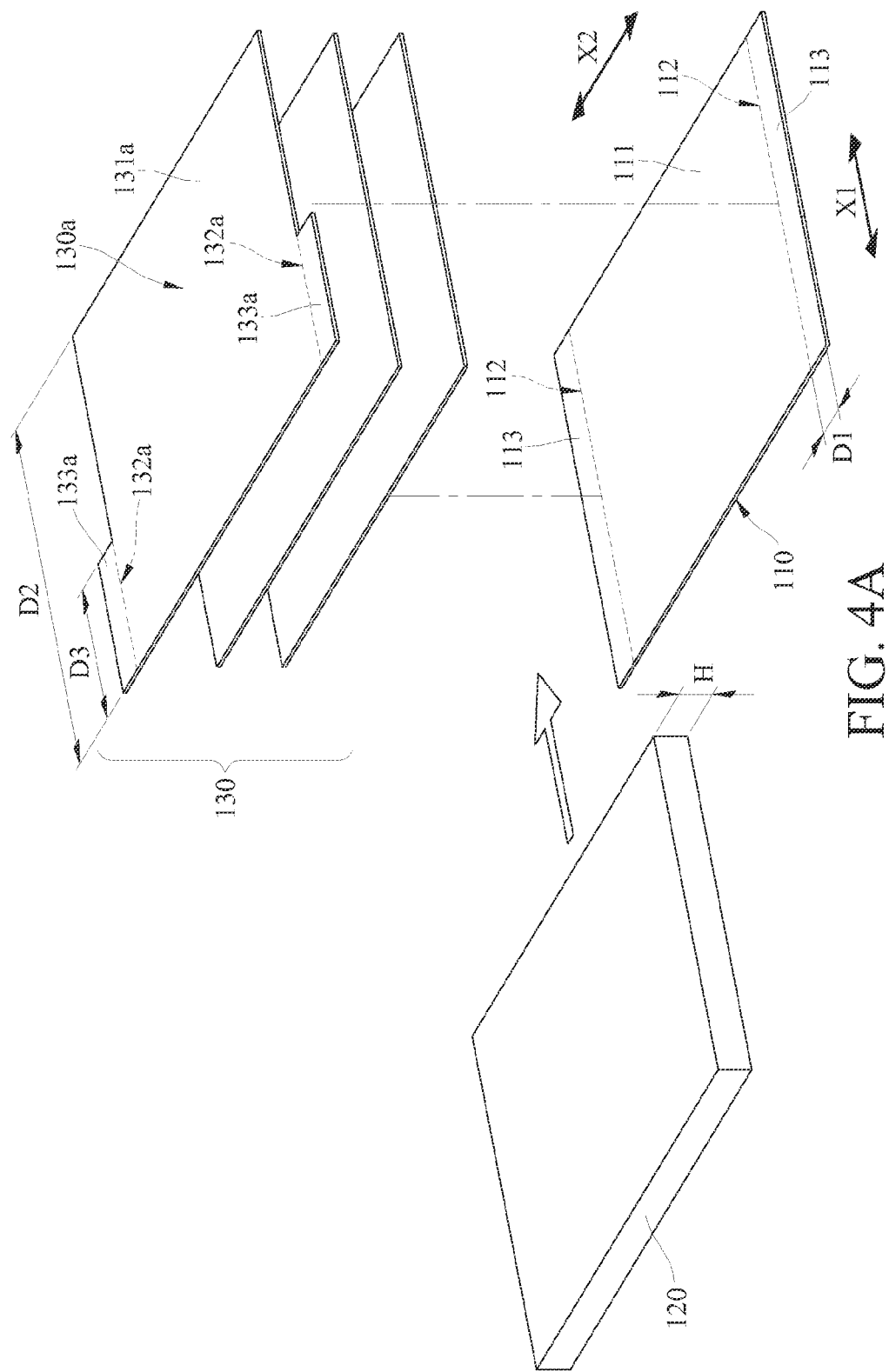
FIGS. 4A to 4C are schematic views of positioning portions and extending portions according to a second embodiment of the disclosure.
Figure 4B:
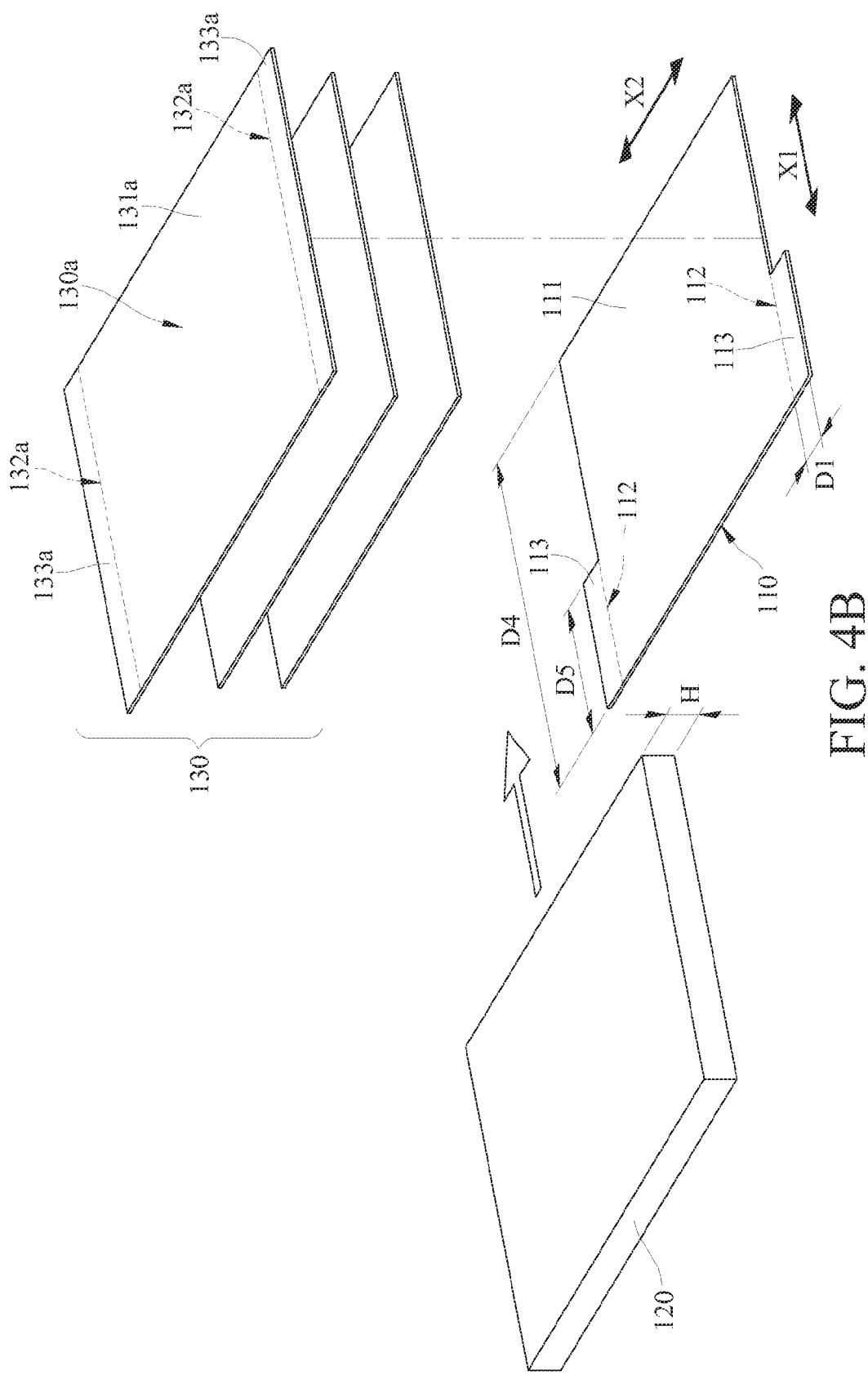
Figure 4C:
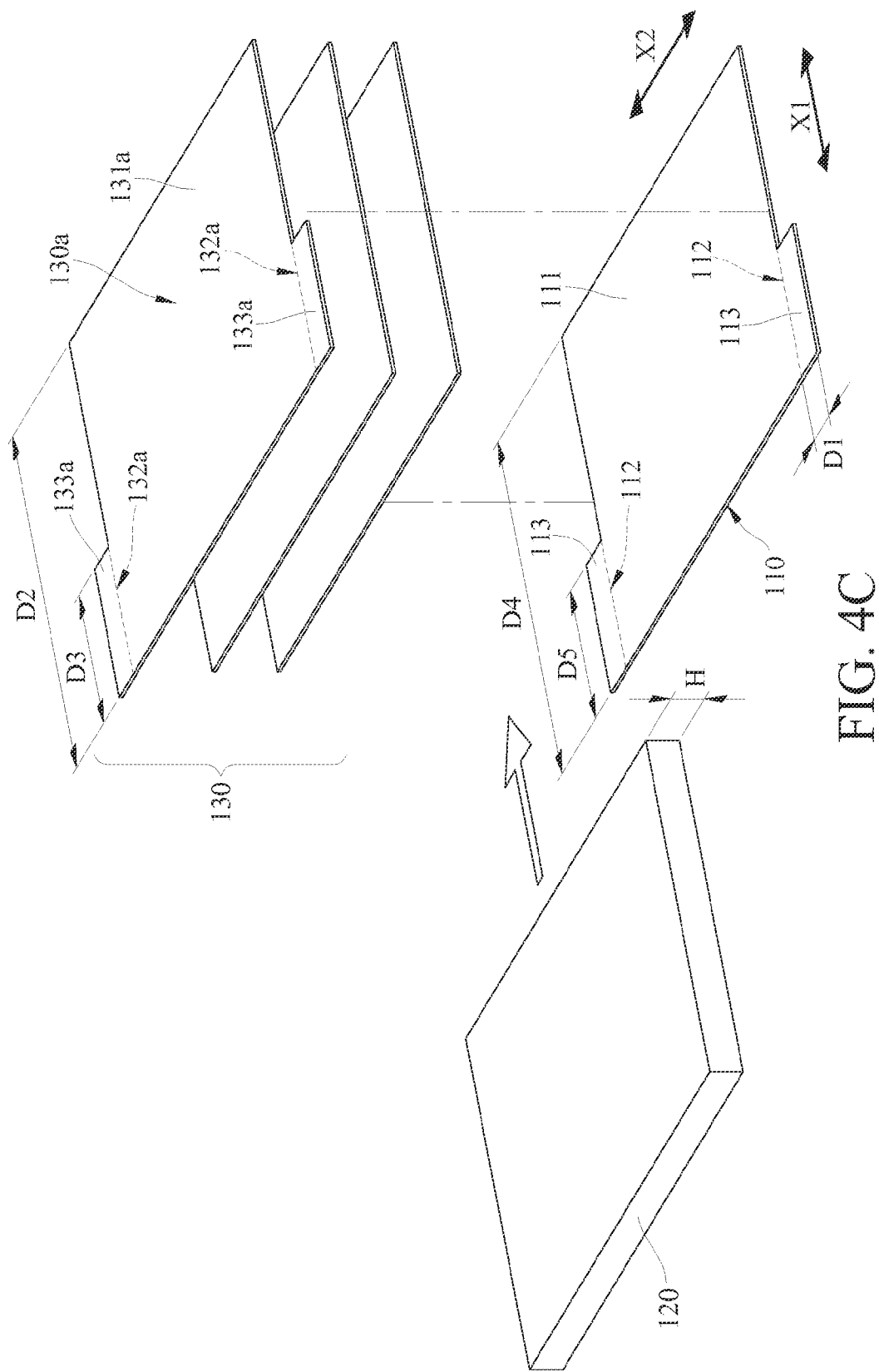

In the first embodiment of the disclosure, the lengths of the positioning portions 133a are equal to the main body 131a in a direction X1, and the lengths of the extending portions 113 are equal to the supporting plate in the direction X1. However, the above-mentioned structures of the positioning portions 133a and those of the extending portions 113 are not limited thereto. In the second embodiment of the disclosure, as shown in FIG. 4A, the lengths D3 of the positioning portions 133a are less than the lengths D2 of the main body 131a in the direction X1. Similarly, as shown in FIG. 4B, the lengths D5 of the extending portions 113 are less than the lengths D4 of the supporting plate in the direction X1. In some other embodiments, as shown in FIG. 4C, the lengths D3 of the positioning portions 133a are less than the lengths D2 of the main body 131a in the direction X1, and the lengths D5 of the extending portions 113 are smaller than the lengths D4 of the supporting plates in the direction X1.

Because the extending portions 113 and the positioning portions 133a only need to be at least partially overlapped with and fixed to each other, the lengths D3 of the positioning portions 133a are less than the length D2 of the main body 131a, and the lengths D5 of the extending portions 113 are less than the length D4 of the supporting plate 111. Therefore, the positioning portions 133a and the extending portions 113 may be fabricated and adjusted according to actual requirement, thereby reducing the material costs and the width of the bezels 100 and 400.

Figure 5:
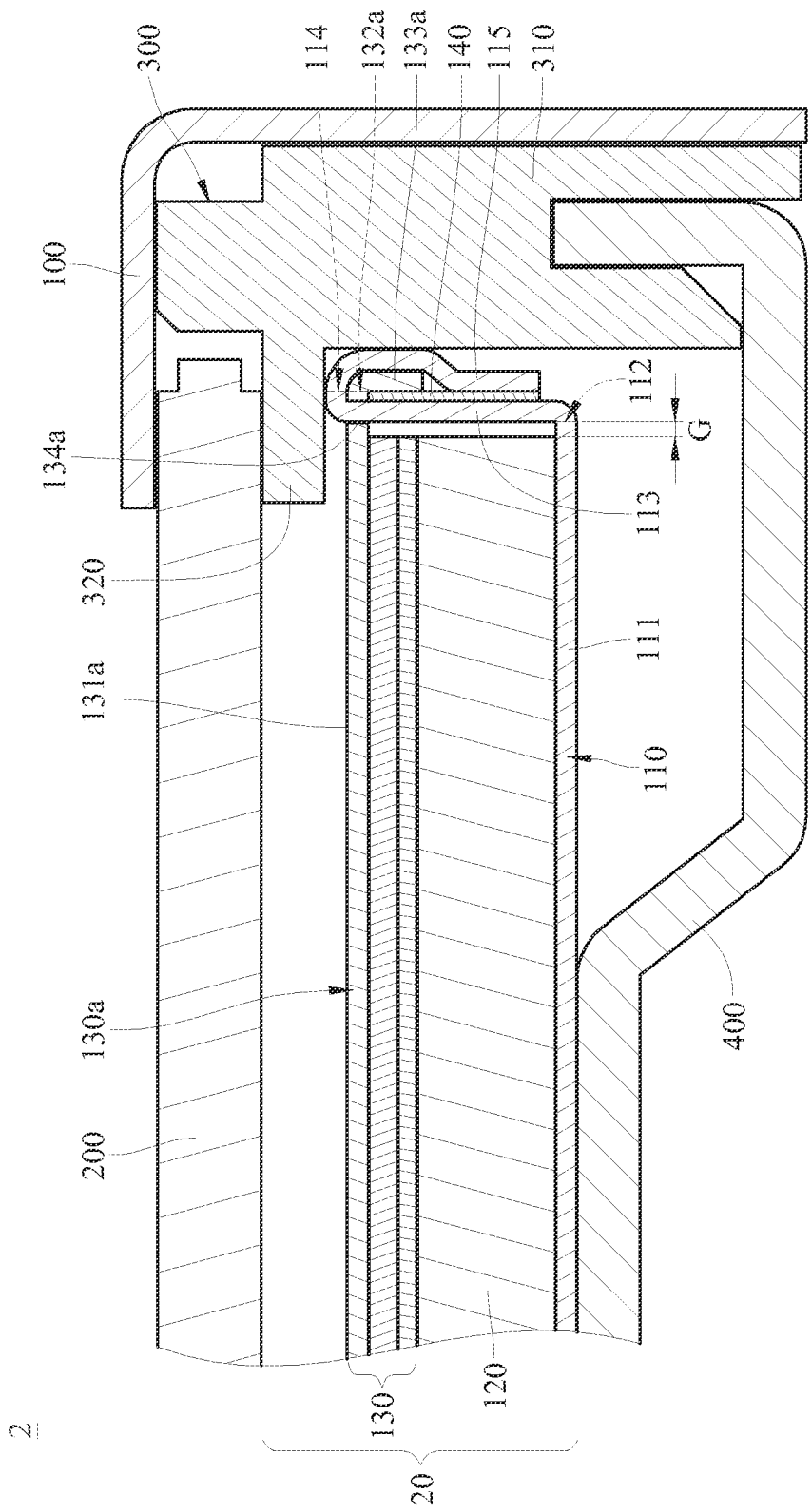
FIG. 5 is a cross-sectional view of a display device according to a third embodiment of the disclosure.
Figure 6A:
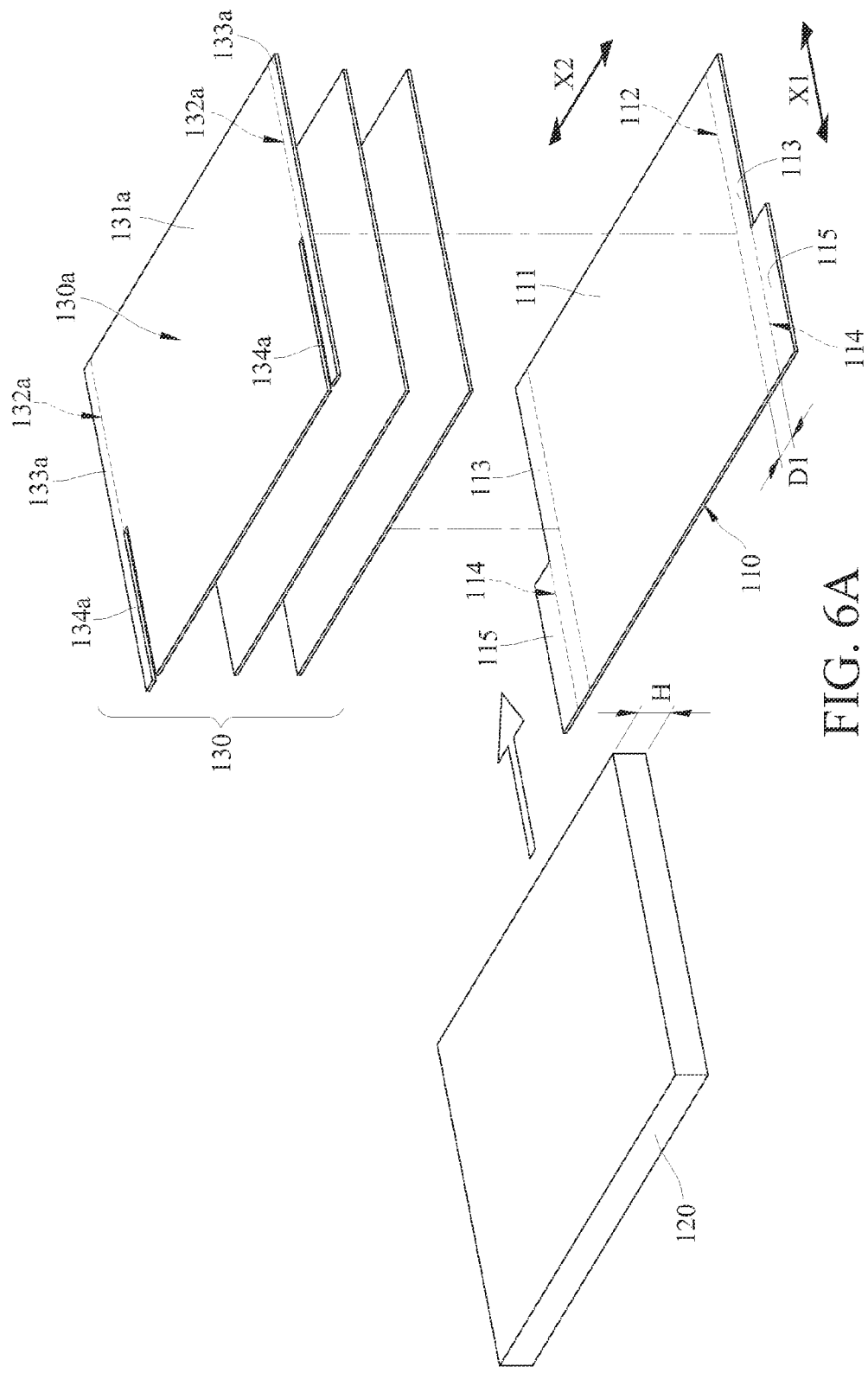
FIGS. 6A to 6C are schematic assembly views of a backlight module according to the third embodiment of the disclosure.
Figure 6B:
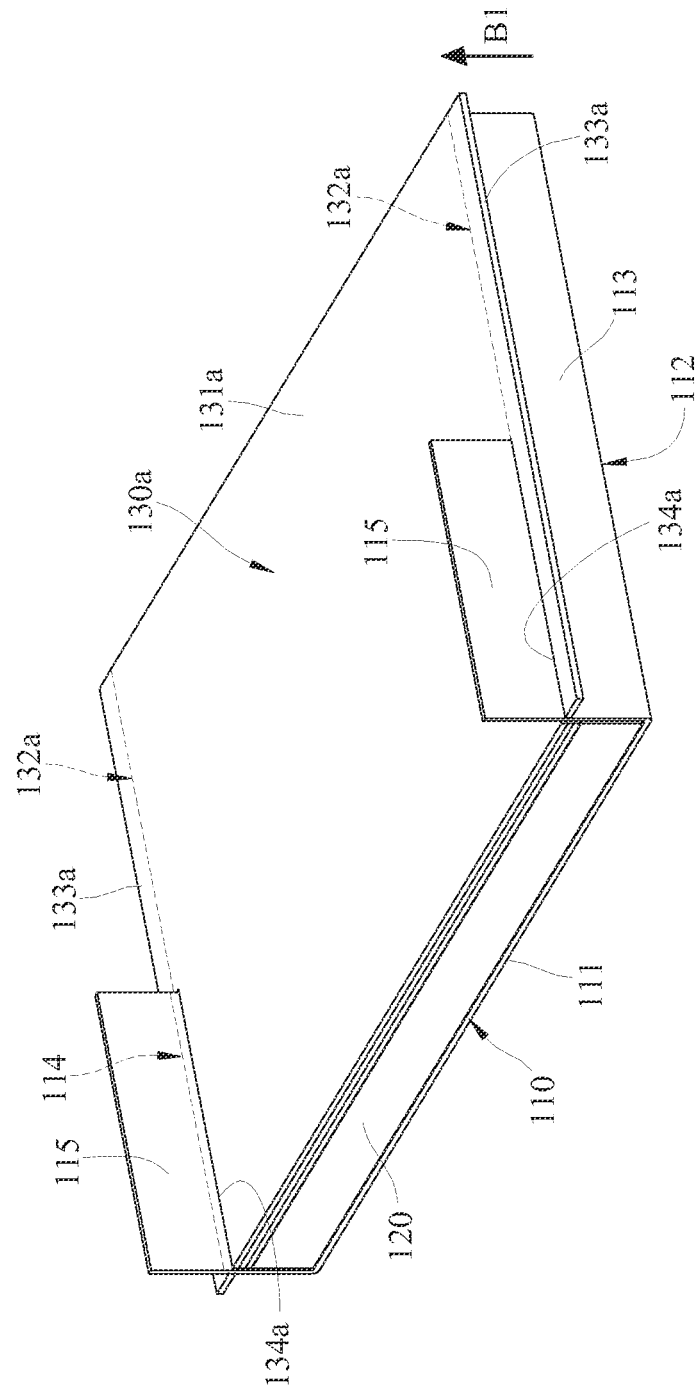
Figure 6C:
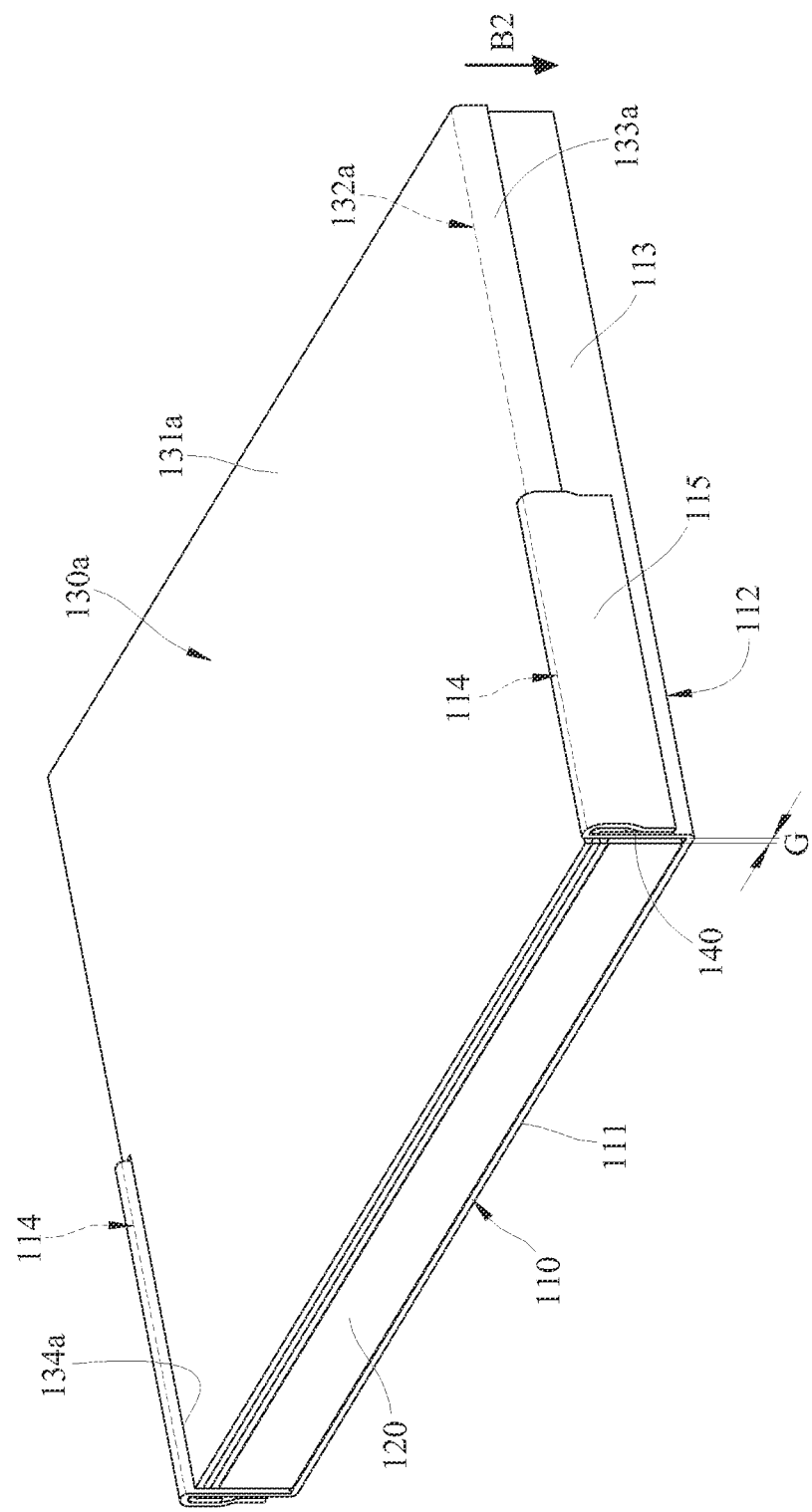

FIG. 5 is a cross-sectional view of the display device according to a third embodiment of the disclosure. FIGS. 6A to 6C are schematic assembly views of the backlight module according to the third embodiment of the disclosure. As shown in FIGS. 5 and 6A, a display device 2 comprises a back bezel 400, a backlight module 20, a display panel 200 and a front bezel 100. The backlight module 20, disposed on the back bezel 400, comprises a reflector 110, a light guide plate 120 and multiple films 130. The light guide plate 120 is disposed on the reflector 110, and the multiple films 130 are disposed on the light guide plate 120. An upper film 130a of the multiple films 130 has slits 134a adjacent to each of second fold lines 132a, and the start of each of the slits 134a is located near the side of the main body 131a which is not connected to the positioning portion 133a. The reflector 110 further comprises a lug 115 located at the edge of each of the extending portions 113, and the position of the lugs 115 approximately correspond to the slits 134a, respectively. Third fold lines 114 are formed between the lugs 115 and the first fold lines 112.

As shown in FIG. 6B, the extending portions 113 are bent along the first fold line 112 and in the direction B1. The positioning portions 133a are bent along the second fold line 132a in the direction B2. Each of the lugs 115 passes through the corresponding slits 134a. As shown in FIG. 6C, afterwards, the lugs 115 are bent along the third fold line 114 and in the direction B2. The lugs 115 are attached to the outer surface of the positioning portions 133a or are attached to the extending portions 113 by an adhesive 140. At this moment, the positioning portions 133a are attached to the outer surface of the extending portions 113 by the adhesive 140. In detail, the positioning portions 133a are bent along the second fold lines 132a and in the direction B2 from the main body 131a, and are attached to the outer side of the extending portion 113 by the adhesive 140.

Figure 6D:
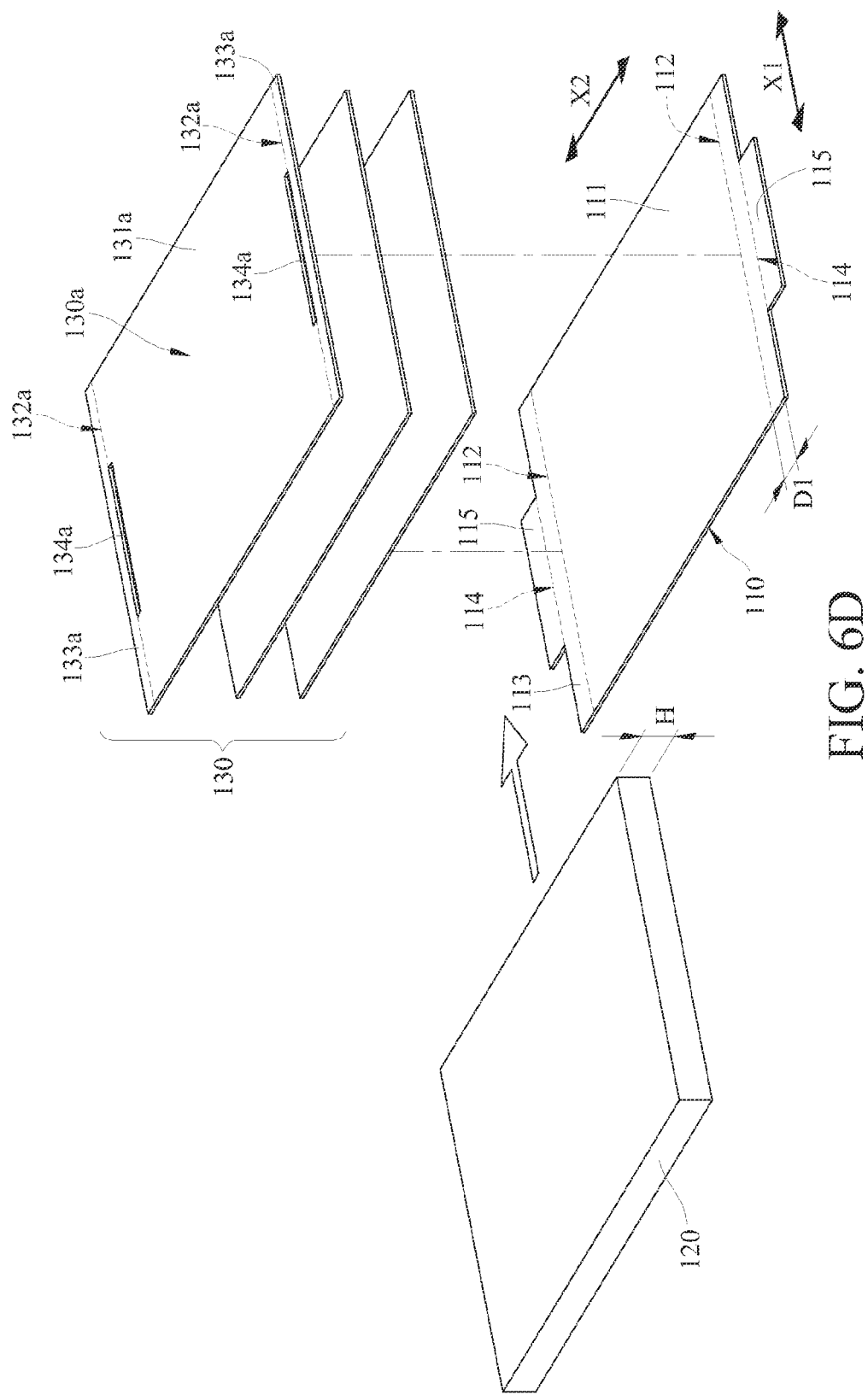
FIGS. 6D to 6F are schematic assembly views of a backlight module according to a fourth embodiment of the disclosure.
Figure 6E:
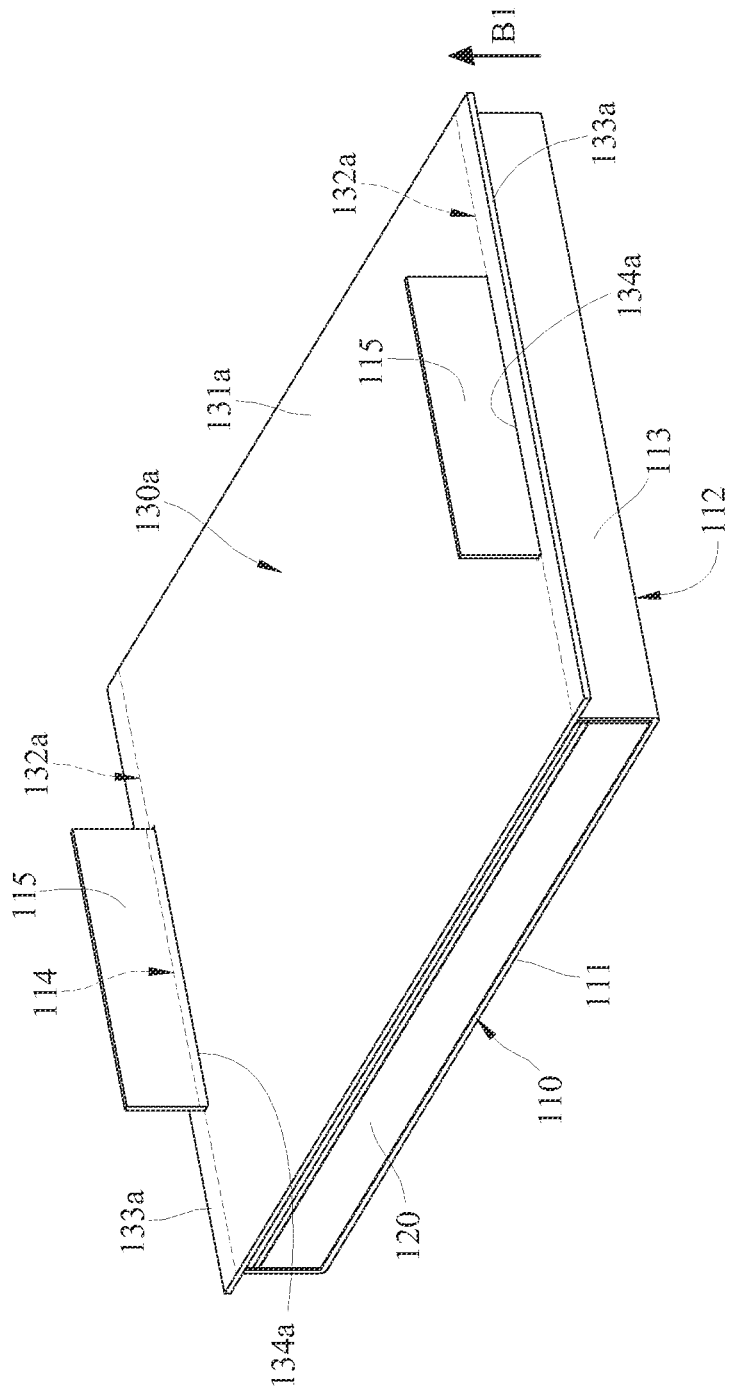
Figure 6F:
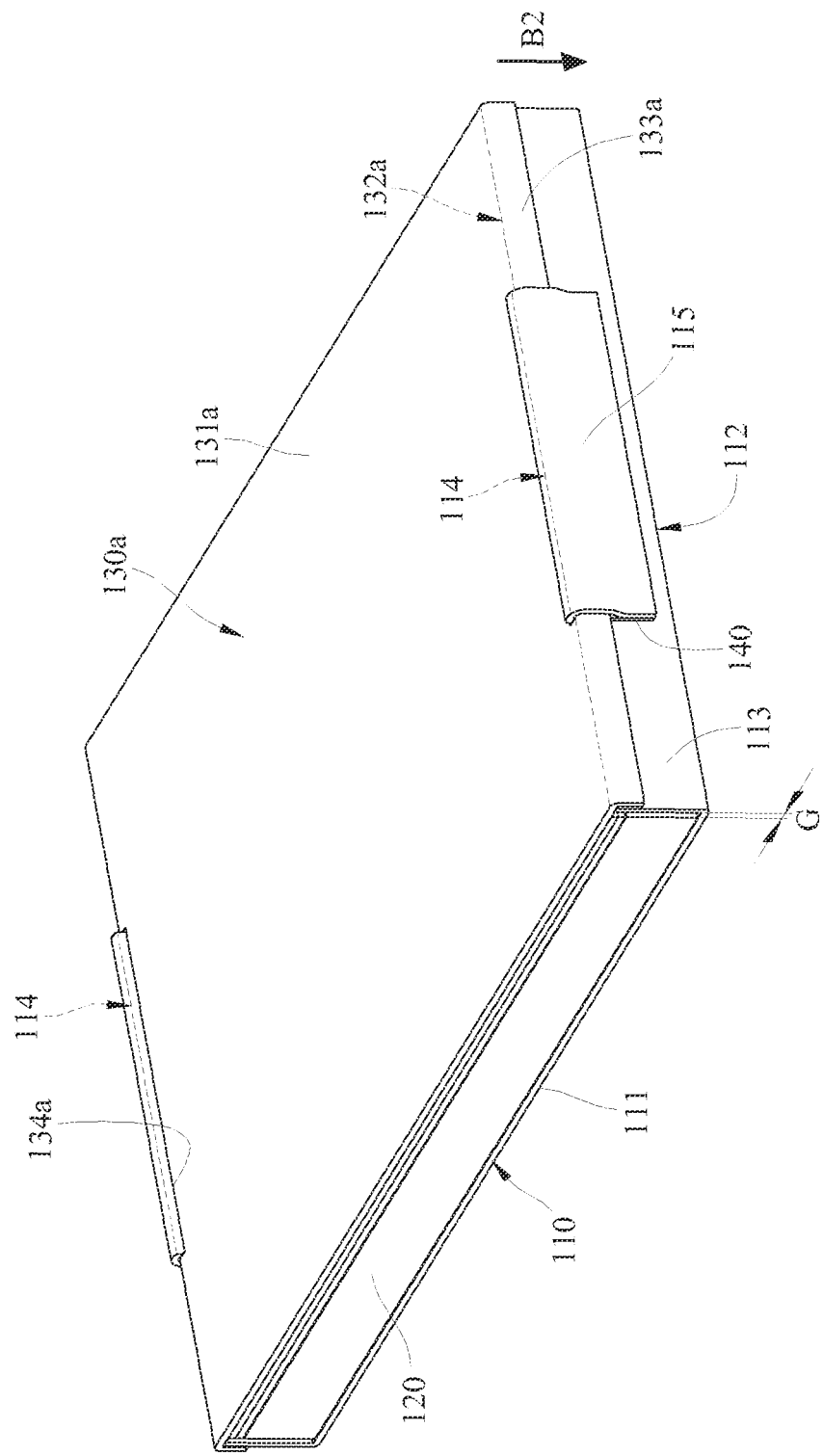

FIGS. 6D to 6F are schematic assembly views of the backlight module according to a fourth embodiment of the disclosure. The structures in the fourth embodiment shown in FIGS. 6D to 6F are similar to those in the third embodiment shown in the FIG. 6A to 6C, and therefore the same numerals represent the same or similar elements, and only differences are described hereinafter.

The difference between the third embodiment and the fourth embodiment is that the silts 134a in the fourth embodiment have a closed outline. As shown in FIG. 6D, the reflector 110 further comprises two lugs 115 located at two opposite edges of the extending portions 113, and the positions of the lugs 115 approximately correspond to the slits 134a.

Referring to FIG. 6E, the extending portions 113 are bent along the first fold lines 112 and in the direction B1, and the positioning portions 133a are bent along the second fold lines 132a and in the direction B2. Each of the lugs 115 passes through the corresponding slits 134a. As shown in FIG. 6F, afterwards, the lugs 115 are bent along the third fold lines 114 and in the direction B2. In this embodiment, the lugs 115 are attached to the outer surface of the positioning portions 133a or the extending portions 113 by the adhesive 140. Moreover, the positioning portions 133a are bent along the second fold line 132a and in the direction B2, and are attached to the outer surface of the extending portion 113 by the adhesive 140.

It is worth noting that when the assembly of the backlight module in the fourth embodiment is finished, the second fold line 132a and the third fold line 114 are approximately aligned with each other. In other words, according to this design, the lugs 115 pass through the corresponding slits 134a, and then both the lugs 115 and the positioning portions 133a are bent in the direction B2 at the same time, so that the backlight module 20 is easy to be assembled for operators.

The slit 134a is a narrow cut or a narrow notch, and the outline of the slit 134a is Y-shaped such that the corresponding lug 115 may pass through smoothly. After passing through the slit 134a, the lug 115 bends reversely toward a side of the supporting plate 111, so that the positioning of multiple films 130 and the reflector 110 is enhanced. It is worth noting that the projection area of the slit 134a which is projected to the display panel 200 does not overlap with the active area (namely, the area that can be viewed by users) of the display panel 200, which avoids affecting the quality of the display device 2.

Figure 7:
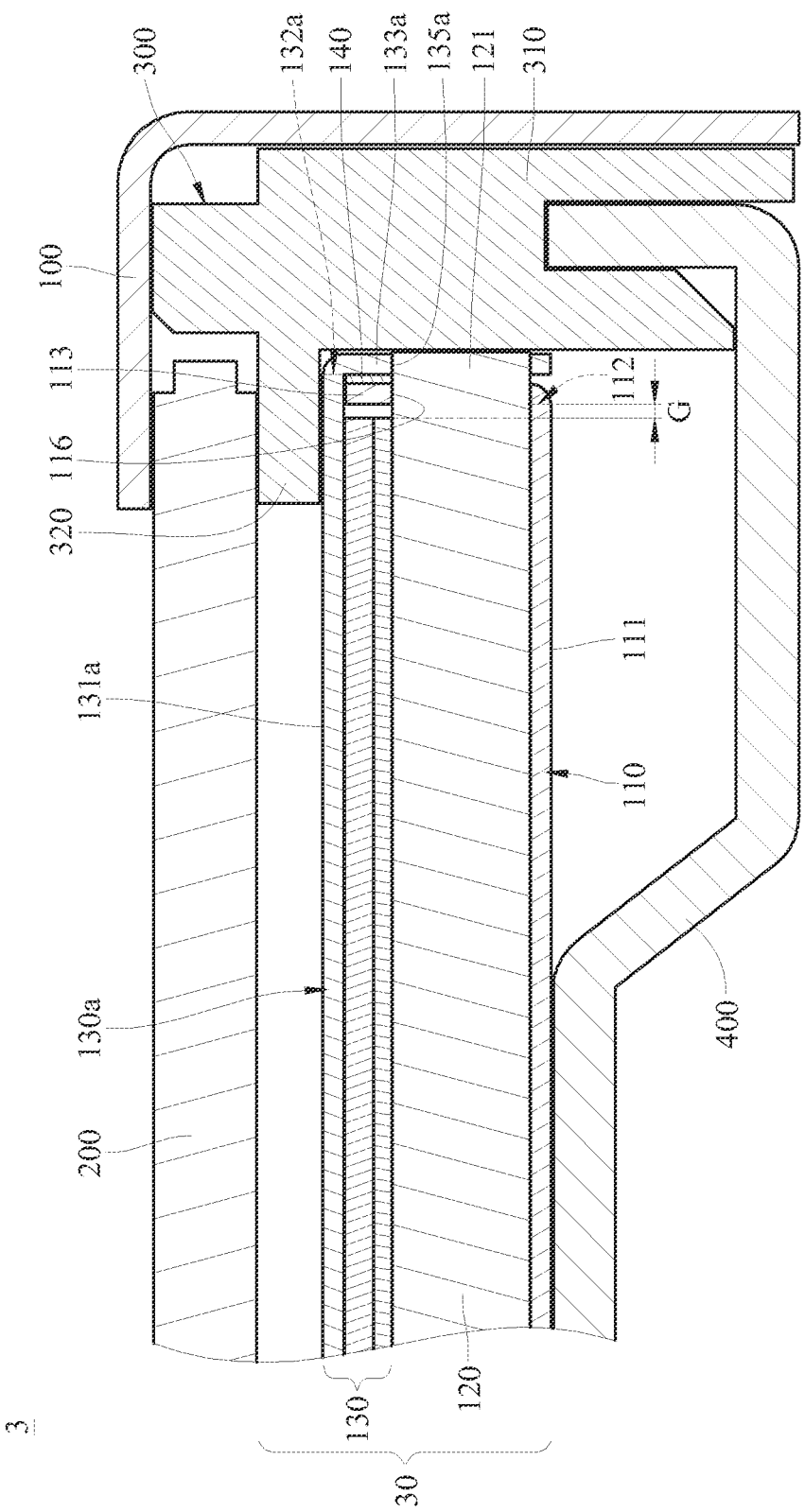
FIG. 7 is a cross-sectional view of a display device according to a fifth embodiment of the disclosure.
Figure 8A:
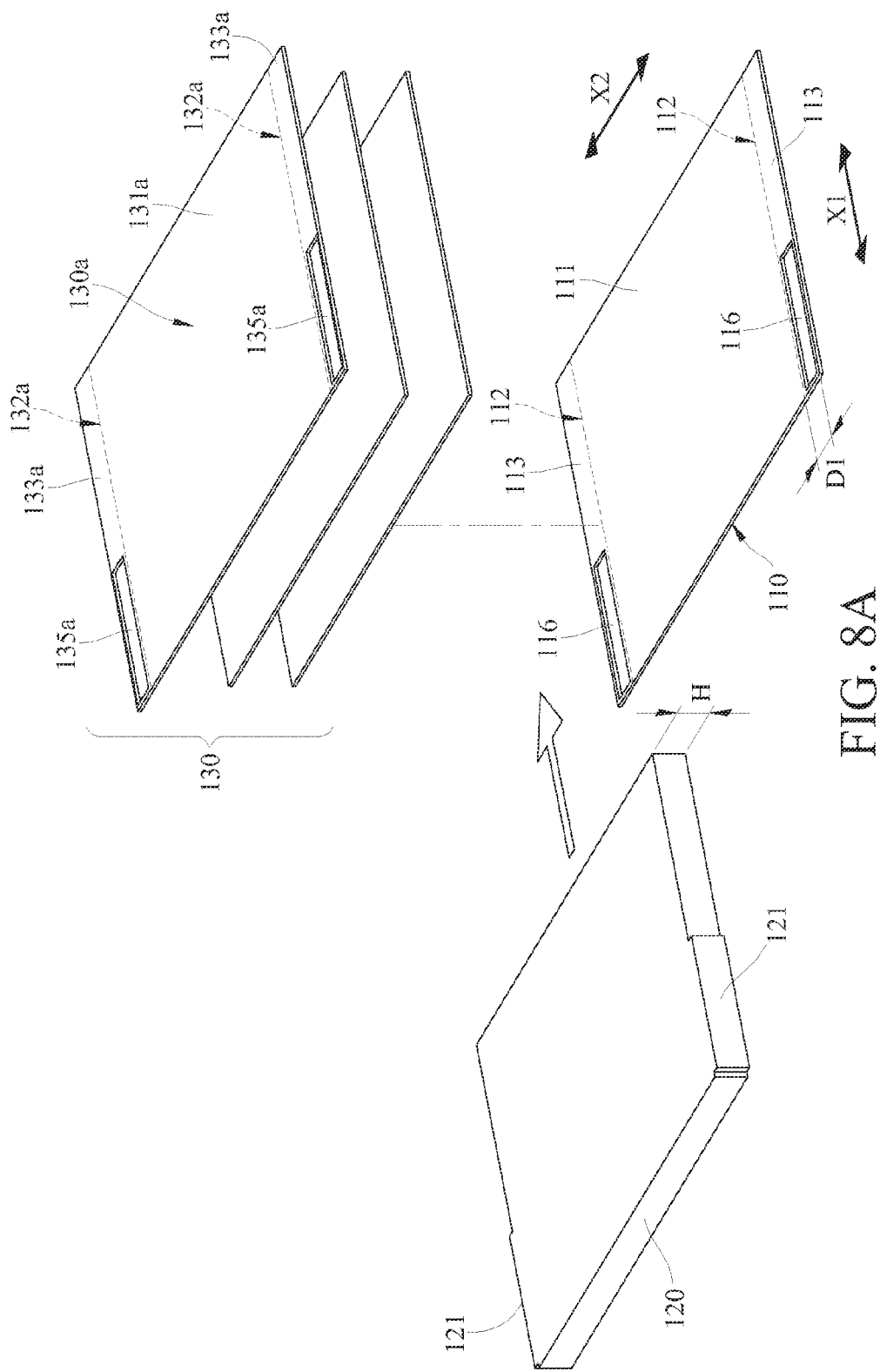
FIGS. 8A to 8C are schematic assembly views of a backlight module according to the fifth embodiment of the disclosure.
Figure 8B:
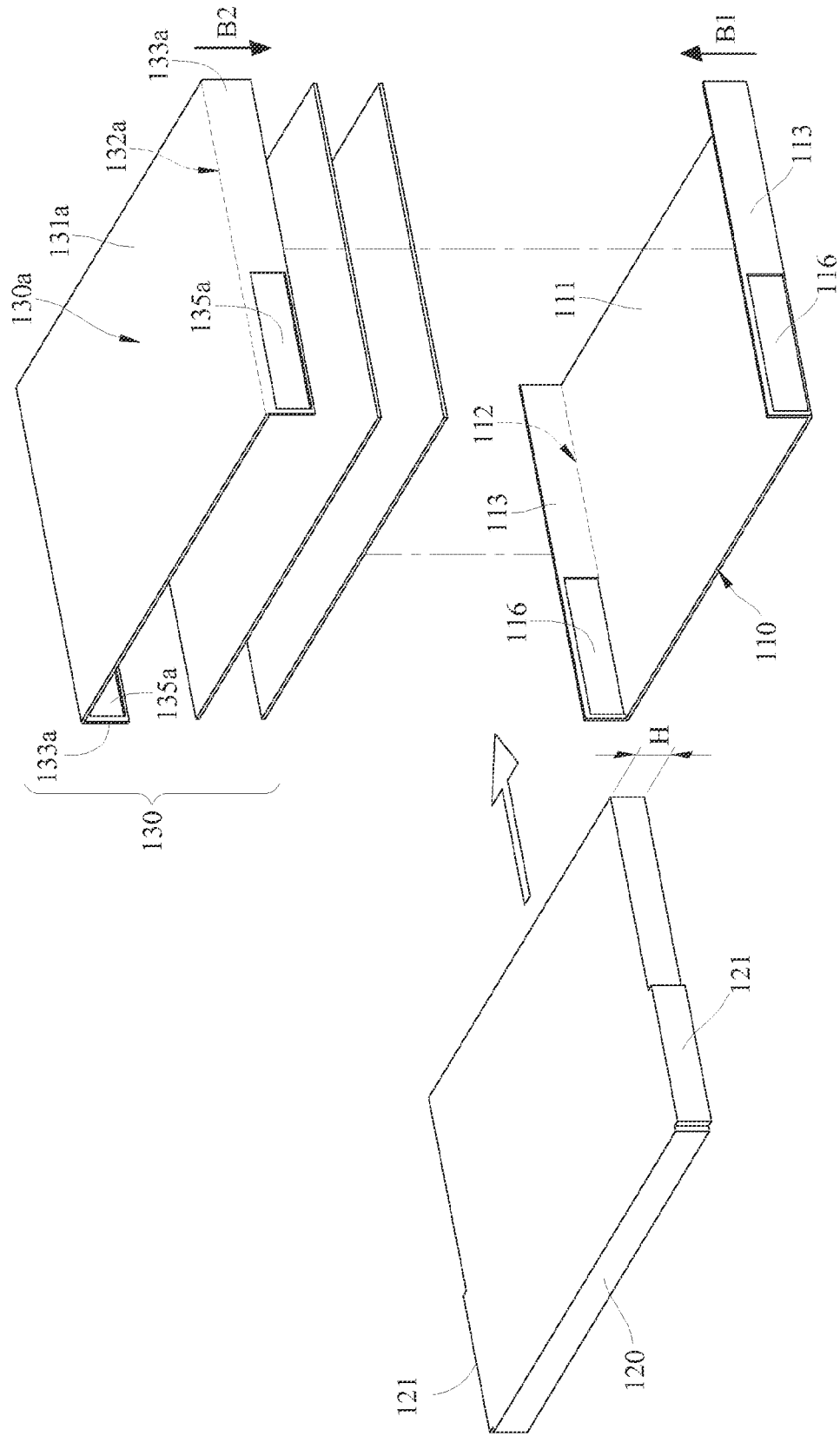
Figure 8C:
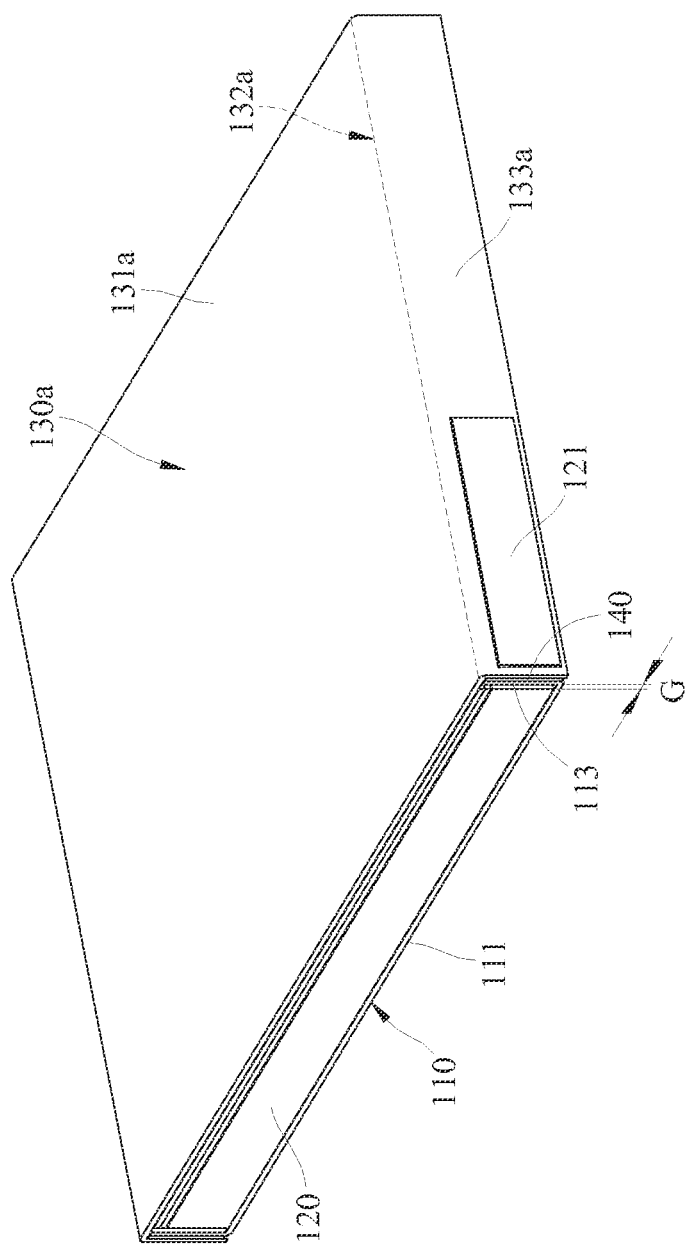
Figure 9:
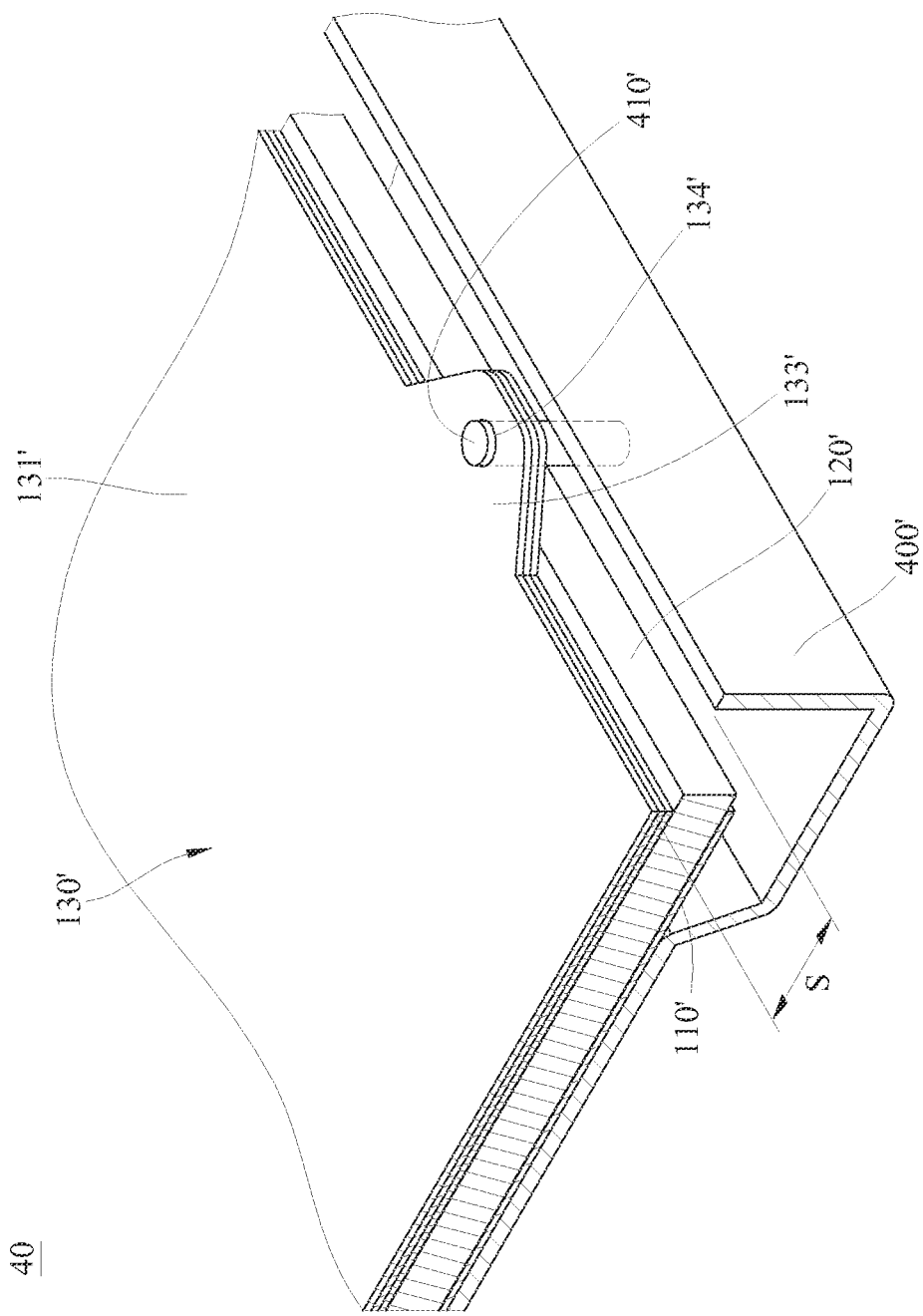
FIG. 9 is a schematic view of a conventional backlight module.

FIG. 7 is a cross-sectional view of the display device according to a fifth embodiment of the disclosure. FIGS. 8A to 8C are schematic assembly views of the backlight module according to the fifth embodiment of the disclosure. As shown in FIGS. 7 and 8A, a display device 3 comprises a back bezel 400, a backlight module 30, a display panel 200 and a front bezel 100. The backlight module 30 is disposed on the back bezel 400. The backlight module 30 comprises a reflector 110, a light guide plate 120 and multiple films 130. The light guide plate 120 is disposed on the reflector 110, and the multiple films 130 are disposed on the light guide plate 120. Each of the extending portions 113 of the reflector 110 has a first hole 116, each of the positioning portions 133a of the upper film 130a in the multiple films 130 has a second hole 135a, and the edge of the light guide plate 120 has a bump 121. As shown in FIGS. 8B and 8C, the extending portions 113 are bent along the first fold lines 112 and in the direction B1, and the positioning portions 133a are bent along the second fold line 132a and in the direction B2. The multiple films 130 are disposed on the light guide plate 120, and the light guide plate 120 is located between the supporting plate 111 and the main body 131a.

The positions of the second holes 135a approximately correspond to those of the first holes 116, respectively, such that the bump 121 is adapted for being inserted into the first hole 116 and the second hole 135a at the same time. However, as shown in FIG. 8C, each of the positioning portions 133a is at least partially overlapped with the corresponding extending portions 113, respectively, and the positioning portions 133a do not cover the bump 121 of the light guide plate 120. Therefore, the second holes 135a of the positioning portions 133a do not need to be disposed.

In addition, in this embodiment, the light guide plate 120 also includes a plurality of the bumps 121. A plurality of the first holes 116 and a plurality of the second holes 135a are formed to correspond to the bumps 121, respectively. In this embodiment, the bumps 121 of the light guide plate 120 are engaged with the first holes 116, or are engaged with the first holes 116 and the second holes 135a at the same time, so that the light guide plate 120 may avoid damage generated by the shaking during assembly and delivery processes. Moreover, the light guide plate 120 and the multiple films 130 are fixed together at the same time so as to effectively reduce the width of the bezels 100 and 400.

In the above-mentioned embodiments of the disclosure, the extending portions 113 are located on the two opposite sides of the supporting plate 111, and the positioning portions 133a are located on the two opposite sides of the main body 131a, but are not limited to the disclosure. In other embodiments, the extending portions 113 of the reflector 110 are disposed on three sides and the light source is disposed on the other side.

Furthermore, for convenient folding and fixing, the first fold lines 112, the second fold lines 132a and the third fold lines 114, in all embodiments of the disclosure, are perforations (namely, perforation lines), or marginal lines (ridgelines) formed by punching, pressing or stamping process, but are not limited to the disclosure.

In comparison with prior arts, in the backlight module, according to the above-mentioned embodiments of the disclosure, the extending portions 113 of the reflector 110 and the positioning portions 133a of the film 130a are fixed to each other, thus effectively reducing the width of the bezel so as to meet the demand for reducing the volume of the display

What is claimed is:

1. A backlight module, comprising:
   a reflector having a supporting plate and two extending portions, wherein the two extending portions are located on two opposite sides of the supporting plate, respectively, an edge of at least one of the extending portions has a lug, and a first fold line is formed between the lug and the extending portion;
   a film having a main body and two positioning portions, wherein the two positioning portions are located on two opposite sides of the main body, respectively, the film includes two second fold lines, and the two second fold lines are located between the main body and the two positioning portions, respectively; and
   a light guide plate located between the supporting plate and the main body;
   wherein the main body corresponds to the supporting plate, the two extending portions are bent toward the main body, the two positioning portions are bent toward the supporting plate, and the two positioning portions are at least partially overlapped with the extending portions, respectively.

2. The backlight module according to claim 1, wherein the reflector includes two third fold lines, and the two third fold lines are located between the supporting plate and the two extending portions, respectively.

3. The backlight module according to claim 2, wherein gaps are formed between an edge of the light guide plate and each of the two third fold lines, respectively.

4. The backlight module according to claim 1, wherein the main body includes a slit adjacent to the second fold line, and the lug passes through the slit and is bent toward the supporting plate and along the first fold line.

5. The backlight module according to claim 4, wherein a projection area of the slit which is projected to a display panel does not overlap with an active area of the display panel.

6. The backlight module according to claim 1, wherein the lug is attached to an outer surface of at least one of the positioning portions or at least one of the extending portions.

7. A backlight module, comprising:
   a reflector having a supporting plate and two extending portions, wherein the two extending portions are located on two opposite sides of the supporting plate, respectively, and at least one of the extending portions has a first hole;
   a film having a main body and two positioning portions, wherein the two positioning portions are located on two opposite sides of the main body, respectively, at least one of the positioning portions has a second hole, and the second hole corresponds to the first hole; and
   a light guide plate located between the supporting plate and the main body, wherein an edge of the light guide plate has a bump, and the bump is adapted for being inserted into the first hole and the second hole at the same time;
   wherein the main body corresponds to the supporting plate, the two extending portions are bent toward the main body, the two positioning portions are bent toward the supporting plate, and the two positioning portions are at least partially overlapped with the extending portions, respectively.

8. The backlight module according to claim 7, wherein the reflector includes two fold lines, and the two fold lines are located between the supporting plate and the two extending portions, respectively.

9. The backlight module according to claim 8, wherein gaps are formed between the edge of the light guide plate and each of the two fold lines, respectively.

10. The backlight module according to claim 7, wherein the film includes two first fold lines, and the two first fold lines are located between the main body and the two positioning portions, respectively.

11. The backlight module according to claim 10, wherein the edge of at least one of the extending portions has a lug, and a second fold line is formed between the lug and the extending portion.

12. The backlight module according to claim 11, wherein the main body includes a slit adjacent to the first fold line, and the lug passes through the slit and is bent toward the supporting plate and along the second fold line.

13. The backlight module according to claim 12, wherein a projection area of the slit which is projected to a display panel does not overlap with an active area of the display panel.

14. The backlight module according to claim 7, wherein the lug is attached to an outer surface of at least one of the positioning portions or at least one of the extending portions.

* * * * *